United States Patent [19]

Alsenz

[11] Patent Number: 5,067,326
[45] Date of Patent: Nov. 26, 1991

[54] METHOD AND APPARATUS FOR CONTROLLING CAPACITY OF A MULTIPLE-STAGE COOLING SYSTEM

[76] Inventor: Richard H. Alsenz, 2402 Creekmeadows Dr., Missouri City, Tex. 77459

[21] Appl. No.: 571,746

[22] Filed: Aug. 23, 1990

Related U.S. Application Data

[60] Division of Ser. No. 146,285, Jan. 21, 1988, Pat. No. 4,951,475, which is a continuation-in-part of Ser. No. 62,390, Jun. 15, 1987, Pat. No. 4,825,662, which is a continuation of Ser. No. 819,387, Jan. 16, 1986, which is a continuation-in-part of Ser. No. 706,403, Feb. 27, 1985, Pat. No. 4,628,700, which is a continuation of Ser. No. 458,914, Jan. 18, 1983, abandoned, which is a continuation of Ser. No. 257,113, Apr. 24, 1981, Pat. No. 4,612,776, which is a continuation of Ser. No. 62,525, Jul. 31, 1979, abandoned.

[51] Int. Cl.$^5$ .................. F25B 31/00; F04B 49/10
[52] U.S. Cl. ................ 62/193; 62/228.4; 184/6.1; 417/13
[58] Field of Search .......... 62/175, 226, 228.3, 62/117, 228.4, 193; 236/1 EA; 417/5, 7, 44, 13; 184/6.1, 6.16

[56] References Cited

U.S. PATENT DOCUMENTS

| | | | |
|---|---|---|---|
| 686,874 | 11/1901 | Wolcott | 62/228.3 X |
| 834,870 | 10/1906 | Chamberlain et al. | 62/228.3 X |
| 981,840 | 1/1911 | Carpenter et al. | 62/228.3 X |
| 982,794 | 1/1911 | Carpenter et al. | 62/228.3 X |
| 1,601,025 | 9/1926 | King | 62/228.3 X |
| 2,168,157 | 8/1935 | Crago | 62/175 |
| 2,231,069 | 2/1941 | Harris | 62/175 |
| 2,273,281 | 2/1942 | McGrath | 62/510 X |
| 2,274,336 | 2/1942 | Lammers | 62/510 X |
| 2,461,760 | 2/1949 | Newton | 62/228 X |
| 3,122,003 | 3/1962 | Sullivan | 62/157 |
| 3,251,531 | 5/1966 | Strecker | 417/7 |
| 3,251,534 | 5/1966 | Strecker | 417/5 |
| 3,279,377 | 10/1966 | Jacobson | 417/5 |
| 3,286,636 | 11/1966 | Schaub | 417/7 |
| 3,294,023 | 12/1966 | Martin-Vegue, Jr. et al. | 417/44 |
| 3,328,152 | 8/1974 | Charmeil et al. | 200/83 |
| 3,513,662 | 5/1970 | Golber | 62/175 |
| 3,717,300 | 2/1973 | Evalds | 236/1 F |
| 3,744,932 | 7/1973 | Prevett | 417/8 |
| 3,775,025 | 11/1973 | Maher, Jr. et al. | 417/7 |
| 3,835,478 | 9/1974 | Molus | 4/11 |
| 4,081,691 | 3/1978 | Evalds et al. | 307/41 |
| 4,084,388 | 4/1978 | Nelson | 62/152 |
| 4,132,086 | 1/1979 | Kountz | 62/209 |
| 4,184,341 | 1/1980 | Friedman | 62/175 |

FOREIGN PATENT DOCUMENTS

2429583  1/1976  Fed. Rep. of Germany ....... 184/6.1

Primary Examiner—William E. Wayner

[57] ABSTRACT

A refrigeration system is provided with a compressor whose speed is varied to provide load control. In order to prevent compressor damage is lubricating oil pressure sensing control is provided which generates a compressor speed increase signal whenever the oil pressure drops below a predetermined minumum.

13 Claims, 4 Drawing Sheets

| STAGE | $C_1$ | $C_2$ | $U_1$ | $U_2$ | $C_3$ |
|---|---|---|---|---|---|
| 0 | 0 | 0 | 0 | 0 | 0 |
| 1 | 1 | 0 | 0 | 0 | 0 |
| 2 | 1 | 1 | 0 | 0 | 0 |
| 3 | 1 | 1 | 1 | 0 | 0 |
| 4 | 1 | 1 | 1 | 1 | 0 |
| 5 | 1 | 1 | 1 | 1 | 1 |

METHOD AND APPARATUS FOR CONTROLLING CAPACITY OF A MULTIPLE-STAGE COOLING SYSTEM

CROSS-REFERENCE TO RELATED APPLICATIONS

This application is a division of Ser. No. 146,285, now U.S. Pat. No. 4,951,475 filed Jan. 21, 1988 which is a continuation-in-part of copending U.S. patent Application Ser. No. 062,390, now U.S. Pat. No. 4,825,662 filed June 15, 1987, which is a continuation of U.S. patent application Ser. No. 819,387 filed Jan. 16, 1986, Ser. No. 706,403 filed Feb. 27, 1985, now U.S. Pat. No. 4,628,700, which is a continuation of U.S. patent application Ser. No. 458,914 filed Jan. 18, 1983, now abandoned, which is a continuation of U.S. patent application Ser. No. 257,113 filed Apr. 24, 1981, now U.S. Pat. No. 4,612,776, which is a continuation of U.S. patent application Ser. No. 062,525, now abandoned.

BACKGROUND OF THE INVENTION

This invention relates to a method and apparatus for increasing the average coefficient of performance of a multiple-stage refrigeration or cooling system.

In the past, the cycling of stages of a multiplestage refrigeration or cooling system has been principally accomplished by setting each stage at a successively lower "cut-in" and "cut-out" pressure of the refrigerating fluid flowing in the suction line from the evaporator coil to the compressor(s) or cooling stages. The use of successively lower "cut-in" and "cut-out" pressure ranges for each cooling stage results in an average pressure which is lower than the mean pressure of the pressure differential between the "cut-in" and "cut-out" pressures of the highest stage. Various mechanical and electromechanical systems have been devised to attempt to solve this problem, primarily utilizing the successively lower pressure ranges for each successive cooling stage as described above.

Patents which are typical of the prior art for electromechanically controlling refrigeration compressor capacity include the following U.S. Pat. Nos.: 3,885,938; 3,828,152; 3,719,057; 3,581,519; 3,580,006; 3,552,137, and 3,377,816.

Increased efficiencies in a multi-compressor refrigeration system having at least one variable speed compressor could be realized if each cooling stage could be controlled at a single highest "cut-in" and "cut-out" pressure levels that would ensure adequate temperatures in the refrigerated space served by the evaporator coils, and by enabling the compressors to energize and deenergize when the variable speed compressors have attained their respective maximum and minimum speeds.

SUMMARY OF THE INVENTION

At least one variable speed compressor is operated in parallel with a plurality of commonly piped compressors for controlling the capacity of a multiple-stage refrigeration or cooling system. The variable speed compressor is controlled over a range of speed to accommodate varying system capacity load requirements, thus establishing an improved range of control and hence improve the coefficient of performance of the system.

Further improvement to the system performance is made by utilizing multiple cooling fans to cool the condenser coil. By monitoring the temperature of the condensed coolant or by monitoring the pressure inside the condenser coil, the number of fans cooling the condenser coil are changed and at least one variable speed fan is used to obtain a finer degree of control. Controlling the temperature or pressure of the condenser within predetermined limits improves the coefficient of performance for the system.

A microprocessor-based control system responsive to system parameters is utilized. Suction pressure ranges which control the energization and deenergization of compressors, control the speed of the variable speed control compressors, and the desired time delays for improving the life of the compressors are programmed into the microprocessors.

The temperature of the system environment is continually monitored. The microprocessor control system is programmed to adjust the suction pressure range of the system to maintain a cooled environment at the desired temperature.

BRIEF DESCRIPTION OF DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In The Drawings.

DESCRIPTION OF PREFERRED EMBODIMENT

Figures 1, 4:
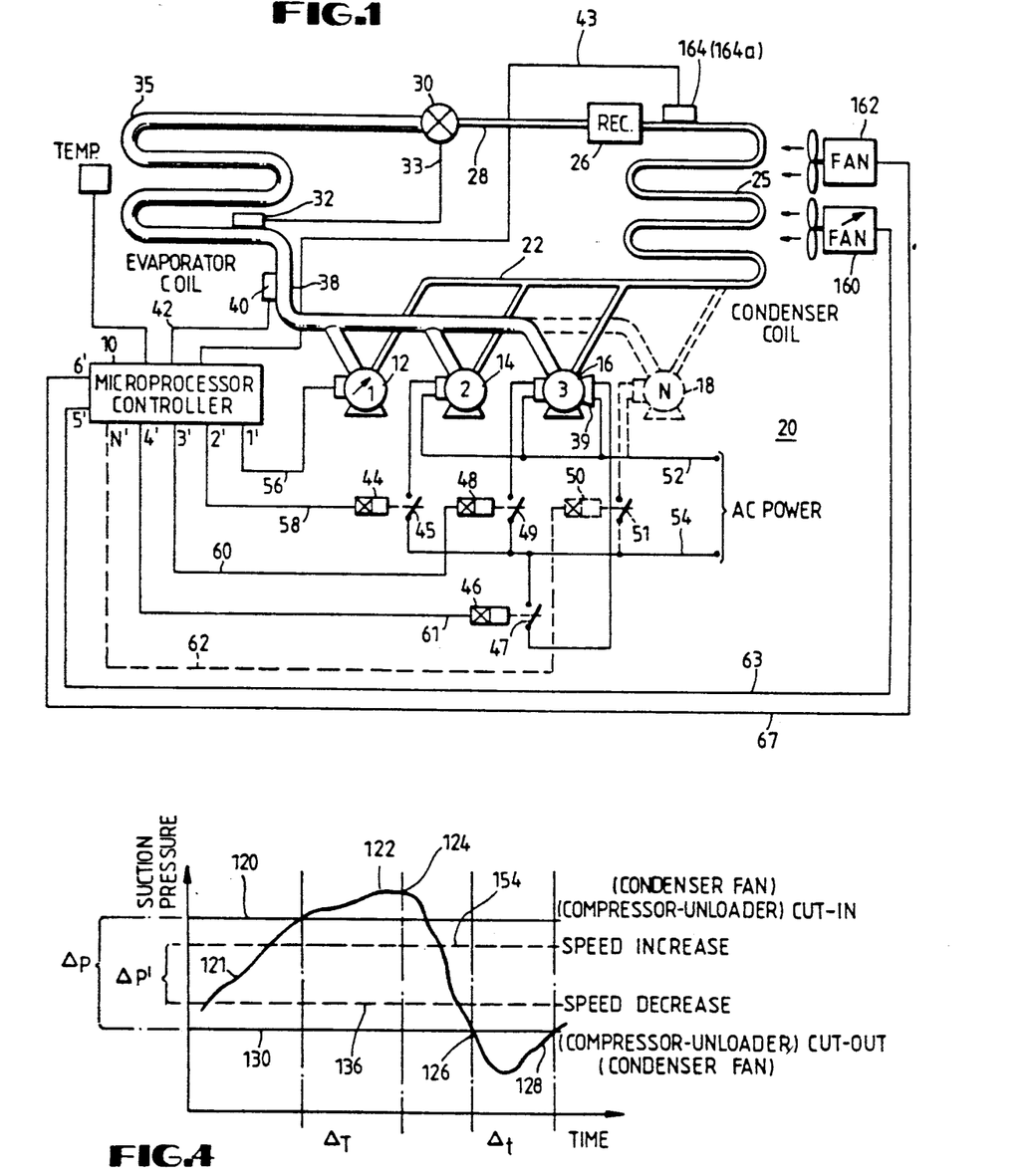
FIG. 1 is a simplified schematic of a multiple-stage cooling or refrigeration system including the capacity. control apparatus according to this invention.
FIG. 4 is a graphical representation of the refrigerating fluid pressure vs. time of the multiple-stage refrigeration or cooling system illustrated in FIG. 1.

The system of the invention, illustrated in FIG. 1, includes a plurality of compressors with at least one compressor having variable speed, a condenser coil, at least one condenser fan, at least one expansion valve and evaporator coil, a plurality of system parameter sensing devices and a microprocessor based control system.

Referring now to FIG. 1, the refrigeration system capacity microprocessor controller 10 is shown disposed in a multiple-stage refrigeration or cooling system 20 having a plurality of parallel piped refrigerant compressors 12, 14, 16, and 18 for discharging compressed pressurized refrigerant vapor through discharge line 22 to a condenser coil 25 where the pressurized refrigerant vapor is condensed to a liquid and then delivered to a receiver vessel 26. From the receiver 26, the liquid refrigerant flows through line 28 and through an expansion device or valve 30, typically a mechanical expansion valve responding to the temperature in suction line 38 as sensed by temperature sensing device 32. The temperature signal from sensor 32 is applied to valve 30 through conductor 33 to initiate the expansion valve action. The liquid refrigerant is injected through expansion device 30 into the evaporator coil 35 where the liquid refrigerant, encountering the low pressure of the evaporator coil, boils and evaporates thus absorbing heat from the evaporator coil. The hot vaporized refrigerant from the evaporator coil is drawn through suction line 38 to the inlet ports of the multiple compressors 12-18. The number of parallel compressors running in the system varies according to the refrigerating or cooling system load. In FIG. 1, the compressors are shown as 12, 14, 16 and N, N being a positive integer. Compressors 14 and 18 are shown having fixed capacity and speed, compressor 12 having variable speed and compressor 16 having an unloader 39. The system of this invention has at least one variable speed compressor. It will be understood that any combination of fixed speed, variable speed, and unloader-type compressors can be utilized for the purpose of this invention.

A pressure detecting means 40, such as a transducer or a pressure switch, is attached to the suction line 38. This pressure transducer determines the refrigerant vapor pressure within suction line 38 and generates an electrical signal representative of the measured pressure. The signal is applied through conductor 42 as an input to the microprocessor controller 10. A second pressure transducer 164 is attached to the condenser coil 25, which determines the pressure inside the condenser coil and generates an electrical signal representative of the measured pressure. The signal is applied through conductor 43 as an input to the system capacity microprocessor controller. Alternately a temperature sensor or transducer 164a may be used in place of the pressure transducer 164. When a temperature transducer 164a is used in place of the pressure transducer 164, it is attached at the receiver end of the condenser coil, which ensures that the temperature transducer is in contact with the liquid coolant in the condenser 25, thus ensuring prompt response to changes in the condensate temperature.

The microprocessor controller 10 illustrated in FIG. 1 has a plurality of outputs corresponding to the number of the cooling stages, i.e., the number of parallel compressors and unloaders staged in the system. Unloader 39 is equivalent to another compressor in parallel. Accordingly, there are a corresponding "N" number of outputs from the system capacity microprocessor controller 10 labelled 1', 2', 3', 4', 5', 6' and N'. The microprocessor controller output 2' is applied through conductor 58 to the coil of a relay 44 which controls relay switch contacts 45 for applying AC power via conductors 52 and 54 to the second compressor 14 for energizing the compressor when it is desired to cut the compressor into the system. Similarly, the 3' and N' outputs of the microprocessor controller are applied through conductors 60 and 62, respectively, to the coils of relays 48 and 50, respectively, for closing switches 49 and 51, respectively, for applying AC electrical power to the N compressors, respectively, for either turning on or turning off the compressors. The microprocessor controller output 1' is applied through conductor 56 and carries an analog control signal which varies the speed of the variable speed compressor 12. The controller circuit output 4' is applied through conductor 61 to the coil of a relay 46 which controls relay switch contacts 47 which applies AC power to energize the unloader 39 of compressor 16. The microprocessor controller output 5', also an analog signal, is applied through conductor 63 and varies the speed of the condenser fan 160. The controller circuit output 6 is applied through conductor 67 to energize the condenser fan 162.

Figure 2:
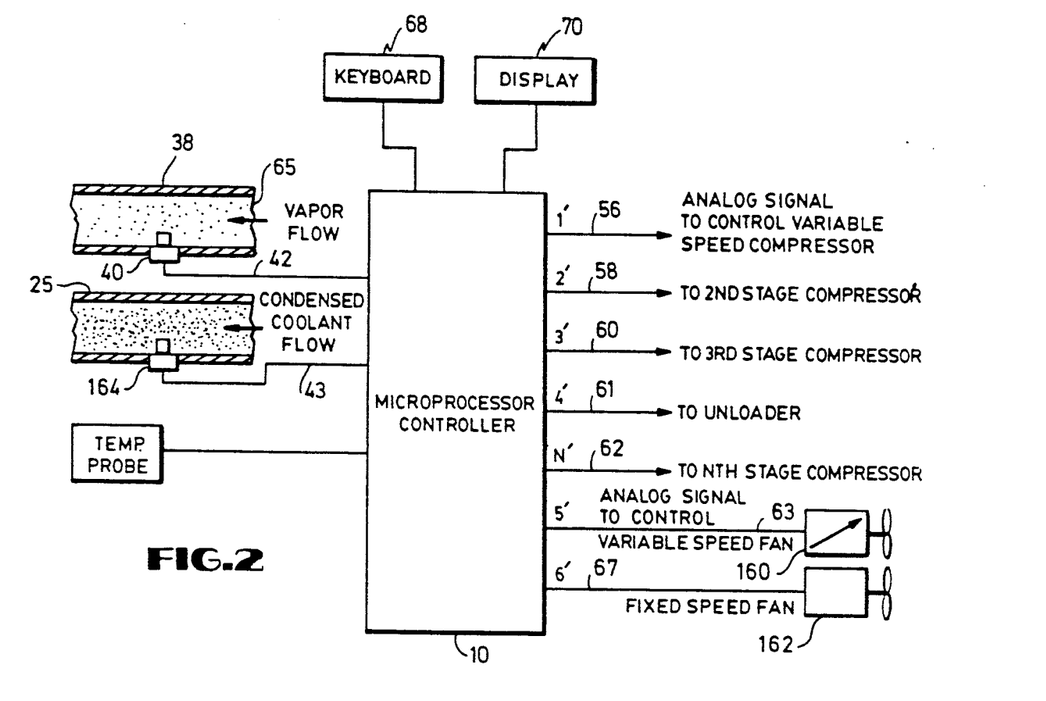
FIG. 2 is a block diagram schematic utilizing a microprocessor for controlling the refrigeration system illustrated in FIG. 1.

FIG. 2 illustrates a microprocessor-based control system for controlling the refrigeration system illustrated in FIG. 1. However, it should be understood that an analog or digital control system may acheive similar results. The control system of FIG. 2 includes a microprocessor, memory for storing a program, and input/output circuitry. Data is input into the microprocessor controller 10 via keyboard 68, and a Display 70 displays the data received from the microprocessor controller. The microprocessor controller 10, receives the values of system parameters, such as pressure and temperature via lines 42, 43, 43a and the like. FIG. 2, as an example, illustrates two pressure sensors 40 and 164 and a temperature sensor 164a.

The pressure transducer 40 is sealingly inserted into the refrigerant vapor flow 65 in suction line tubing 38. Similarly pressure transducer 164 is sealingly inserted into the condenser line 25. The temperature sensor 164a may be used in place of the pressure transducer 164. The pressure transducer 164 or the temperature transducer 164a may be any conventional pressure or temperature detecting means for generating an electrical signal representative of the corresponding pressure or temperature within the condenser coil 25.

To fully understand the operation of the control system of FIG. 2, it is considered helpful to first understand the control parameters illustrated in the graph of FIG. 4. The graph of FIG. 4 depicts the system refrigerating fluid pressure vs. time wherein the system suction pressure is represented by pressure trace 121. Referring to FIG. 4, a speed increase suction pressure 134 and a speed decrease suction pressure 136 are stored in the microprocessor controller. The microprocessor controller constantly monitors the system suction pressure, and increases the speed of the variable speed compressor when the suction pressure represented by the trace 121 exceeds the pressure represented by the speed increase pressure 134 and decreases the speed of the variable speed compressor when the suction pressure falls below the speed decrease pressure 136. The variable speed compressor endeavors to maintain the system suction pressure within the limits $\Delta P'$. Similarly, a "cut-in" pressure 120 and a "cut-out" pressure 130 are stored in the microprocessor controller. When the suction pressure exceeds the "cut-in" pressure the microprocessor controller increases the speed of the variable speed compressor. If the variable speed compressor is at its maximum speed and the suction pressure is above the "cut-in" setting, the microprocessor controller energizes a compressor stage in order to reduce the suction pressure back into the $\Delta P$ range. Similarly, when the suction pressure falls below the "cut-out" pressure the variable speed compressor slows down until it reaches a predetermined minimum speed or until a low oil pressure warning signal is received. When a low oil pressure warning signal is received the speed of the compressor is increased until the low oil warning is nulled. When the variable speed compressor cannot satisfy the system suction pressure reduction requirement, the microprocessor controller deenergizes a compressor stage and increases the speed of the variable speed compressor, if necessary, until the suction pressure is returned to the $\Delta P'$ range.

Figure 7:
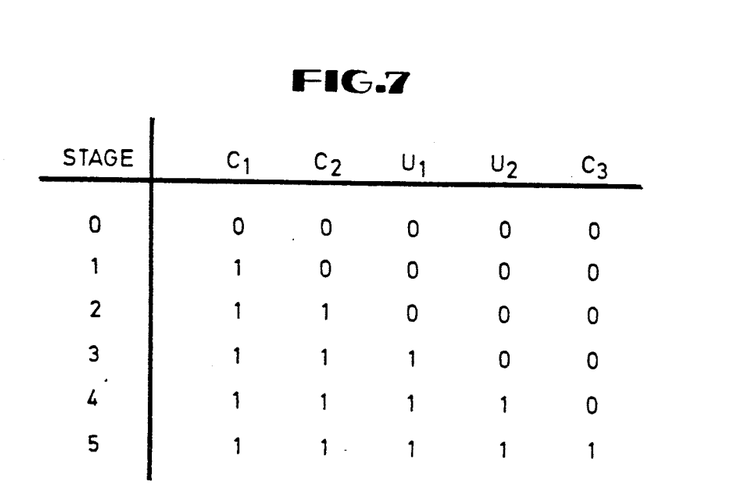
FIG. 7 is an example, in tabulated form, illustrating how different stages are turned-on in a multistage cooling system.

An example of how the multiple-stage compressor system of the invention changes capacity is illustrated in FIG. 7. Referring to FIG. 7, C1, C2, and C3 represents compressors in the system. C1 is a variable speed compressor. U1 and U2 are unloaders. A "0" represents a relay in a deenergized state. A "1" represents a relay in an energized state. "Stage 0" is the system shut-down condition when all relays are deenergized. In stage 1, the variable speed compressor C1, which preferably has the largest capacity in the system, is energized. At "stage 0" the evaporation suction pressure is at a higher pressure than the "cut-in" pressure 120 as illustrated in FIG. 4. As the speed of the compressor of C1 is increased, suction pressure will fall towards the "cut-in" pressure 120. The microprocessor controller will increase the speed of the compressor C1 until the suction pressure falls below the speed increase pressure 134. The compressor C1 will be controlled at such a speed as to maintain the suction pressure within the range of $\Delta P'$. If the suction pressure falls below the speed decrease pressure 136, compressor C1 is slowed down. If the suction pressure rises above the speed increase pressure 134, the compressor C1 is driven faster. When compressor C1 reaches maximum speed and the suction pressure remains above the "cut-in" pressure 120 stage 2 turns on, i.e., compressor C2 is energized. If the suction pressure falls below the speed increase suction pressure 134, the microprocessor controller reduces the speed of compressor C1 to maintain the suction pressure within the $\Delta P'$ range in the same way as in stage 1. When the suction pressure rises above the "cut-in" pressure stage 3 comes into service using the unloader U1. When the unloader U1 brings the suction pressure down below the speed-increase pressure 134 the variable speed compressor C1 continues to hold the suction pressure within the $\Delta P'$ range as in the previous stages. Similarly, as compressor load demand increase "stages 4" and "stages 5" are brought into service and at each stage compressor C1 is used to fine control the suction pressure. When the evaporator suction pressure falls below the "cut-out" pressure 130 and the variable speed compressor is at its minimum speed or the oil pressure falls below its minimum setting the microprocessor controller changes down to the next lower stage. The variable speed compressor already at minimum speed will increase speed to maintain the suction pressure with the $\Delta P'$ range.

The microprocessor controller 10 is programmed to have a "cut-in" and a "cut-out" time delay routine. When the microprocessor controller elects to change the on/off state of a compressor or an unloader, a timer is set and a programmed delay precedes the selected change of state.

The time delay routine remembers the length of the respective time delays, $\Delta T$ and $\Delta t$. As an example, referring to FIG. 4, if $\Delta T$ is set to five (5) minutes, and $\Delta t$ is set to five (5) seconds, when suction pressure trace 121 rises above the "cut-in" pressure 120 at point 122, the five (5) minute $\Delta T$ period begins. However, if suction pressure trace 121 drops back below "cut-in" pressure 120 prior to reaching point 124 i.e. less than $\Delta T$, the "cut-in" signal will cease, disabling "cut-in" time delay, and demands no additional capacity from the compressor unloader combination. However, the next time the suction pressure 121 exceeds the "cut-in" pressure, "cut-in" time delay will again be energized and will produce a delayed "cut-in" signal after only three (3) minutes (the balance of $\Delta T$ left over from the last $\Delta T$ period), thereby energizing or turning on the next compressor in sequence. When suction pressure trace 121 falls below the "cut-out" pressure 130 at point 126, the five (5) second $\Delta t$ period begins. However, when the suction pressure 121 increases and rises above "cut-out" pressure 130 after only three (3) seconds, the "cut-out" signal will cease and disable "out-out" time delay. The next time the pressure trace 121 decreases and falls below the "cut-out" pressure, "cut-out" time delay is enabled and products a delayed "cut-out" signal after only two (2) seconds (the balance of $\Delta t$ left over from the last $\Delta t$ period) and "cut-out" or turn off the compressor which has run the longest. The time delays are applied to unloaders in the same manner as if they were compressors.

In a refrigeration system having equal capacity compressors the microprocessor controller may select the compressor which has been running the longest when it is required to "cut-out" a compressor, or select the compressor which has been idle the longest when it is required to "cut-in" a compressor. The selection sequence mentioned above shares the turn-on and turn-off operations between compressors improving system reliability and increasing compressor life expectancy.

In a refrigeration system having unequal capacity compressors, the microprocessor controller 10 will energize or deenergize, i.e., turn on or turn off the next compressor as described above until the combination of stages has an operating capacity closest to the system load or system capacity demand, thus, causing the system suction pressure to return to the previously established $\Delta P$ range as described hereinabove and illustrated in FIG. 4. As an example, consider a refrigeration system having three unequal capacity compressors 12, 14 and 16. Further consider that the compressors are rated at capacities 1, 2 and 4 horsepower (HP), respectively. The microprocessor controller 10 will select and provide increased or decreased compressor horsepower capacity in discrete increments or combinations to match the system capacity demand. Assuming the above described ratings of 1, 2 and 4 HP for compressors 12, 14 and 16, the various possible combinations of these compressors will provide capacities of 1, 2, 3, 4, 5, 6 and 7 HP in response to changing system capacity demand. The number of combinations for multiple unequal compressors i.e. the number of compressor stages will always be larger than the number of compressors in the system.

Referring back to FIG. 1, the refrigeration capacity control system disclosed herein may also be utilized in controlling a multiple-stage refrigeration or cooling system having multi-cylinder compressors that are staged by controlling the compression of a plurality of compressor cylinders using conventional control valves by having microprocessor controller 10 output control the utilization of the cooling stages by controlling the loading and unloading of cylinders used by the compressors in the system. In addition, it is important to understand that while the system described in FIGS. 1, 2 and 4 uses a separate time delay after determination of the reaching of the established "cut-in" or "cut-out"

pressures, only a single time delay is necessary to enable the selection of successive cooling stages utilizing a single selected "cut-in" system pressure and a single selected "cut-out" system pressure. Further, the ΔP pressure differential between "cut-in" pressure 120 and "cut-out" pressure 130 illustrated in FIG. 4 may be set large or small, depending on the system design and the system operating pressure. In certain systems, the ΔP could be set at zero, with the "cut-in" and "cut-out" pressures being established at the same value.

Figure 6:
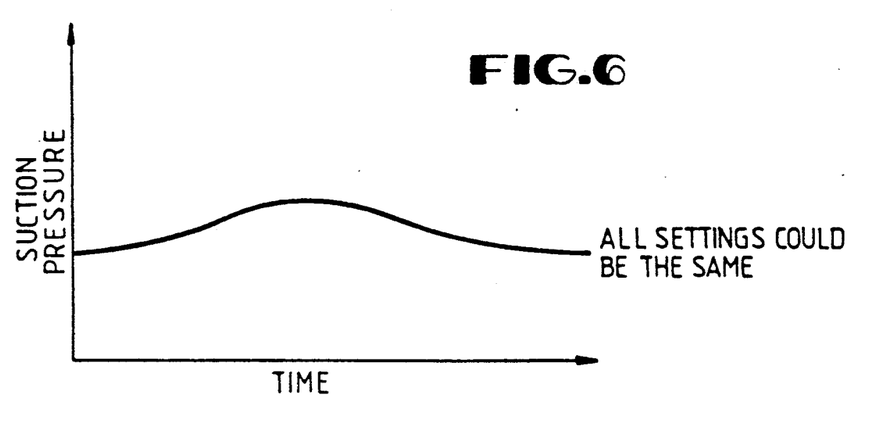
FIG. 6 is a graphical representation of when the "cut-in" and "cut-out" suction pressures are made equal.

Referring to FIG. 4, the suction pressure ranges ΔP and ΔP' may be varied. Further, ΔP may be made equal to ΔP' or ΔP' may range higher than the "cut-in" pressure 120 or may range lower than the "cut-out" pressure 130. Additionally, all pressure settings illustrated in FIG.4 may be made equal thus yielding a single pressure line as illustrated in FIG. 6. The single line illustrated in FIG. 6 results when ΔP and ΔP' are both equal to zero.

Figure 5:
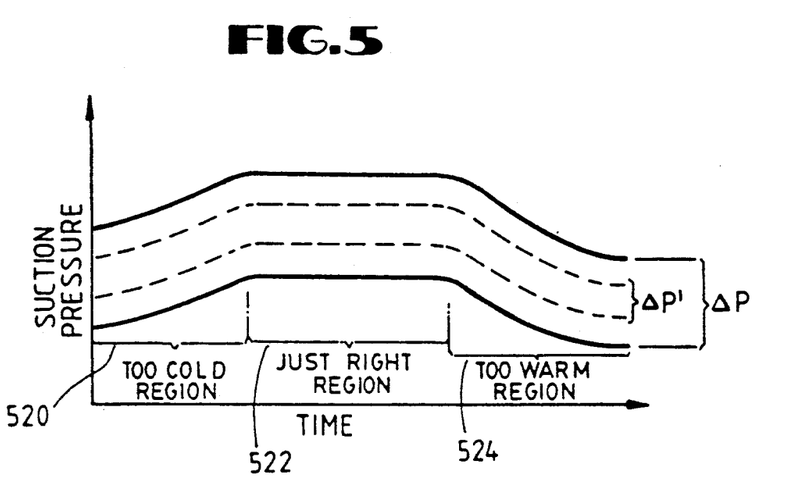
FIG. 5 is a graphical representation of suction pressure settings optimized for preferred environmental temperature.

In a further embodiment the temperature of an environment is monitored by the microprocessor controller. Refer now to FIG. 5. In the event the environment is in a too cold region 520 the microprocessor controller is programmed to raise the evaporator suction pressure limits as illustrated. Conversely, in the event the environment is too warm, the microprocessor controller shifts the evaporator suction pressure limits to a lower value.

When a plurality of evaporator coils are used to cool a plurality of fixtures the temperature of the coldest fixture is used for controlling the refrigeration system. Other fixtures may be maintained at a higher temperature by adjusting a flow control valve fitted to the evaporator coil cooling that particular fixture.

Figure 3:
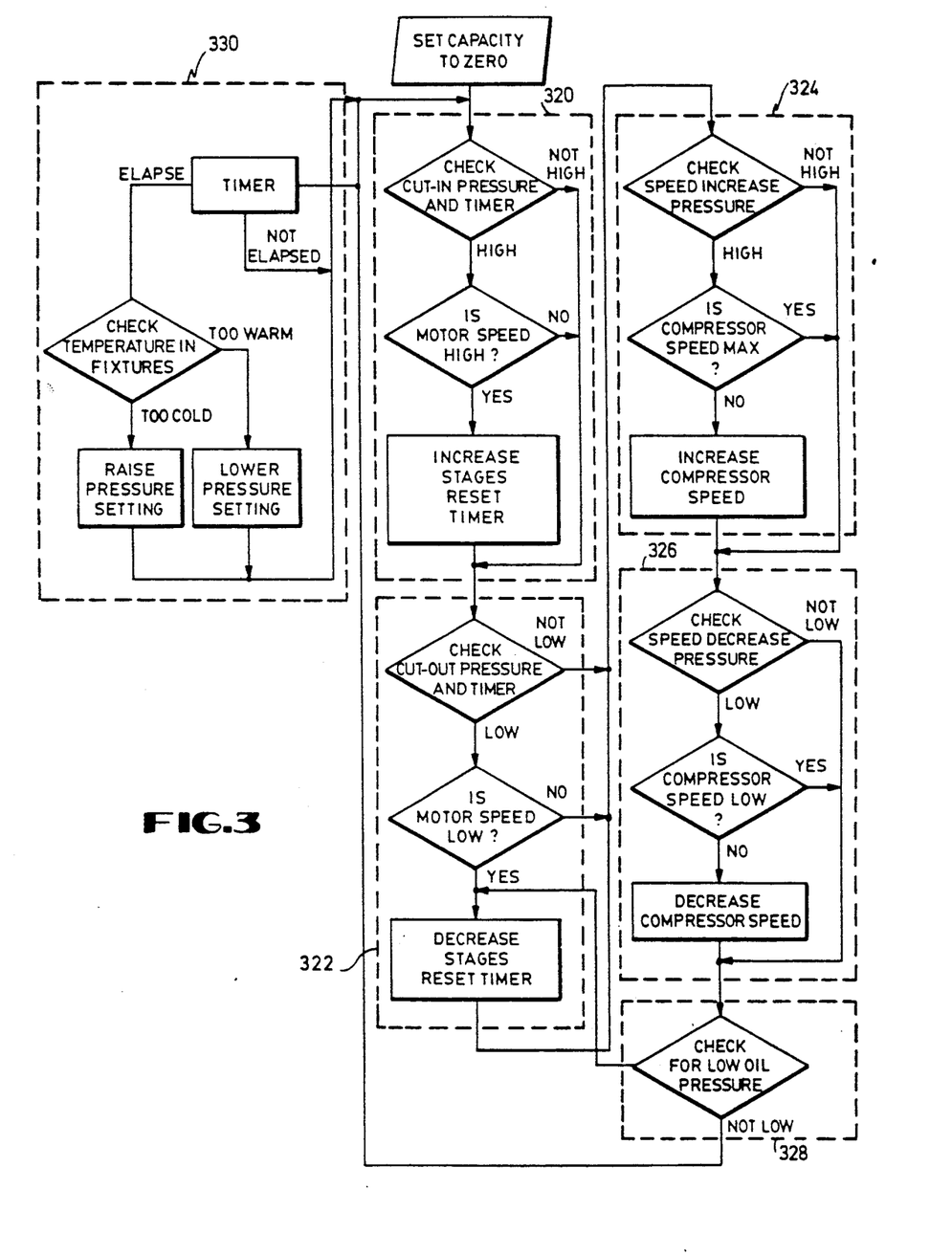
FIG. 3 is a flow chart illustrating the operation of the microprocessor based control system of FIG. 2.

FIG. 3 illustrates a flow diagram for the system control sequence of the system described in FIG. 1. Section 320 observes the compressor "cut-in" pressure 120 and starts the delay timer if it is high. If the "cut-in" pressure is high, the timer has elapsed and the variable speed compressor is at maximum speed, system capacity is increased by energizing a fixed staged compressor. Section 322 follows a similar sequence with respect to the compressor "cut-out" pressure 130 and deenergizes a fixed compressor stage when required. Section 324 monitors the speed increase pressure 134 and increases the speed of the variable speed compressor when necessary. Section 326 decreases the speed of the variable speed compressor when the speed decrease pressure 136 is low. A low oil pressure check is made at section 328, ensuring the speed of the variable speed compressor is increased when the oil pressure is low. Having detected a low oil pressure the flow path is taken directly to section 322 where a decrease capacity command turns off a compressor stage. The flow path then proceeds to section 324 and will increase the speed of the variable speed compressor to ensure a safe oil pressure. Section 330 monitors the temperature of the environment being cooled and raises or lowers the suction pressure ranges ΔP and ΔP' to provide the desired environment temperature conditions.

In a further embodiment, control of the refrigeration system is obtained by using condenser coil fans 160 and 162. Referring to FIG. 4, suction pressure is replaced by condenser pressure and pressure trace 121 now represents the condenser pressure. Condenser pressure is maintained within predetermined pressure limits over the range of ΔP' by varying the speed of the variable speed fan. When the condenser pressure increases above the predetermined "cut-in" pressure or falls below the predetermined "cut-out" pressure fan stages are turned-on or turned-off, respectively, bringing the condenser pressure into the ΔP range. The variable speed fan is used continually to optimise the condenser pressure. Condensate temperature may be used in place of condenser pressure. Suction pressure becomes condensate temperature and trace 121 is now a trace of temperature variation. The temperature control procedure is the same as for pressure control. Time delays ΔT and Δt will be used preceding the turning on and turning off of fans. Different delays will be selected depending on whether temperature control or pressure control is being used and delays will also be varied according to system size and load conditions. The control procedure described above will increase the coefficient of performance when the optimum-value of pressure or temperature have been determined for the system.

While the above description of the preferred embodiments has been made with particular reference to multiple-stage refrigeration system using parallel staged-compressors or staged multiple-cylinder compressors, it will be appreciated that the capacity controlling method and apparatus described herein may be utilized in controlling the capacity of a multiple-stage cooling system such as air-conditioning systems utilizing chilled water and the like, by controlling cooling stages in those systems by controlling utilization of water circulating pumps or controlling the utilization of vanes in centrifugal pumps and the like. Accordingly, numerous variations and modifications may be made in the methods and structure herein described without departing from the present invention.

What is claimed is:

1. Apparatus for controlling the capacity of a refrigeration system having a variable speed compressor, said compressor having an associated suction pressure and a minimum operating oil pressure, said compressor being adapted to operate at variable speeds between a maximum and a minimum speed, said system coprising:
    (a) pressure selecting means for establishing an operating suction pressure range;
    (b) pressure detection means for sensing the suction pressure and for cooperating with said pressure selecting means to generate a first increase speed signal when said suction pressure exceeds the pressure range, and to generate a decrease speed signal when said suction pressure falls below the pressure range;
    (c) oil pressure detection means for providing a second increase speed signal when said oil pressure falls below said minimum operating oil pressure; and
    (d) selection means for receiving said first and second increase speed signals and causing the speed of the compressor to increase in respective response thereto, and for receiving the decrease speed signal and causing the speed of the compressor to decrease in response thereto.

2. Apparatus for controlling the capacity of a refrigeration system comprising a variable speed compressor for compressing a refrigerant, said compressor being adapted to operate between a maximum and a minimum speed, said compressor also utilizing oil and having an associated oil pressure, said refrigeration system further including a condenser for condensing the compressed refrigerant, an evaporator connected to said compressor and to said condenser for evaporating said condensed refrigerant and directing siad evaporated refrigerant to said compressor, pressure selection means for establishing a minimum operating oil pressure level, and an oil pressure detection means that generates an increase speed signal when said oil pressure falls below said minimum operating pressure level.

3. A refrigeration system comprising:
   (a) a predetermined number of commonly piped compressors wherein one compressor being adapted to operate at variable speeds between a maximum and a minimum speed, said variable speed compressor also having an associated operating oil pressure;
   (b) oil pressure selection means for establishing a minimum operating oil pressure level for said variable speed compressor;
   (c) oil pressure detection means for determining the oil pressure associated with said variable speed compressor, said oil pressure detectiong means cooperating with said oil pressure selection means to generate a first increase speed signal when said oil pressure exceeds said minimum oil pressure level, and causing the variable speed compressor to increase the speed in response thereto;
   (d) pressure selection means for establishing a first and a second suction pressure range, each said pressure range having an upper and a lower limit, the first pressure range being associated with the variable speed compressor and the second pressure range being associated with the remaining compressors;
   (e) detection means for sensing the suction pressure and for cooperating with the pressure selection means to provide a second increase speed signal when the suction pressure exceeds the upper limit of the first pressure range, a decrease speed signal when the suction pressure falls below the lower limit of the first pressure range, an increase capacity signal when the suction pressure exceeds the upper limit of the second pressure range and that the variable speed compressor is operating at the maximum speed, and a decrease capacity signal when the suction pressure falls below the lower limit of the second pressure range and that the variable speed compressor is operating at the minimum speed; and
   (f) selection means for receiving the second increase speed and the decrease speed signals and in respective response thereto increasing and decreasing the speed of the variable speed compressor, and for receiving the increase capacity and decrease capacity signals and in respective response thereto energizing and de-energizing a compressor of the refrigeration system.

4. The apparatus of claim 3 wherein said compressors have unequal capacity.

5. The apparatus of claim 3 wherein said compressors have equal capacity.

6. A method of controlling a refrigeration system having a variable speed compressor which is adapted to operate between a minimum and maximum speed, the compressor utilizing oil during operation and having an associated oil pressure, said method comprising the steps of:
   (a) establishing a minimum oil pressure for operating the compressor;
   (b) determining the compressor oil pressure;
   (c) generating an increase speed signal whenever the compressor oil pressure falls below the minimum oil pressure level; and
   (d) increasing the speed of the compressor in response to the increase speed signal.

7. A method of operating a multiple compressor refrigeration system having a common suction pressure wherein at least one compressor is adapted to operate at a variable speed between a minimum and maximum speed, said varaible speed compressor utilizing oil and having an associated oil pressure, said method comprising the steps of:
   (a) establishing a minimum oil pressure for operating the variable speed compressor;
   (b) determining the oil pressure associated with the variable speed compressor;
   (c) increasing the speed of the variable speed compressor whenever the oil pressure associated with the variable speed compressor falls below the minimum oil pressure and that the variable speed compressor is operating at below the maximum speed;
   (d) establishing a minimum common suction pressure;
   (e) determining the common suction pressure of the refrigeration system; and
   (f) decreasing the speed of the variable speed compressor when the common suction pressure falls below the minimum common suction pressure and that the oil pressure is above the minimum oil pressure level.

8. A method of controlling the capacity of a refrigeration system having a plurality of commonly piped compressors with a common suction pressure, at least one compressor in said plurality of compressors being adapted to operate at variable speeds between a minimum and maximum speed, said variable speed compressor utilizing oil and having an associated oil pressure, said method comprising the steps of:
   (a) establishing a minimum oil pressure for the variable speed compressor;
   (b) determining the oil pressure of the variable speed compressor; and
   (c) increasing the speed of the variable speed compressor whenever the oil pressure of the variable speed compressor falls below the minimum oil pressure level and that the variable speed compressor is operating at a speed below the maximum speed.

9. A method of controlling the capacity of a refrigeration system having a plurality of commonly piped compressors with a suction pressure, at least one compressor in said plurality of compressors operating at variable speeds between a minimum and maximum speed, the variable speed compressor utilizin goil and having an associated oil pressure, said method comprising the steps of:
   (a) establishing a minimum oil pressure for the variable speed compressor;
   (b) determining the oil pressure associated with the variable speed compressor;
   (c) establishing a suction pressure range having an upper and a lower limit;
   (d) determining the common suction pressure of the refrigeration system; and
   (e) de-energizing a compressor of the compressor system and increasing the speed of the variable speed compressor whenever the oil pressure associated with the variable speed compressor is below the minimum oil pressure level and that the common suction pressure is below the lower limit of the suction pressure range.

10. A method of controlling the capacity of a refrigeration system having a variable speed compressor having a minimum and maximum speed and a plurality of compressors, said compressors having a common suction pressure, said variable speed compressor utilizing oil and having an associated oil pressure, said method comprising the steps of:

(a) establishing a minimum oil pressure for the variable speed compressor;

(b) determining the oil pressure associated with the variable speed compressor;

(c) establishing a suction pressure range having an upper and a lower limit;

(d) determining the common suction pressure of the refrigeration system;

(e) increasing the speed of the variable speed compressor whenever the suction pressure is above the lower limit and the oil pressure falls below the minimum oil pressure level; and (f) de-energizing a compressor and increasing the speed of the variable speed compressor whenever the oil pressure falls below the minimum oil pressure level and that the suction pressure is below the lower limit.

11. The method of claim 10 wherein the upper and the lower limits are the same.

12. The method of claim 10 wherein the compressors in said plurality of compressors have unequal capacity.

13. The method of claim 10 wherein the compressors in said plurality of compressors have equal capacity.

* * * * *